United States Patent [19]

Mikado

[11] 4,115,810
[45] Sep. 19, 1978

[54] TELEVISION SIGNAL GENERATOR

[75] Inventor: Tsuneo Mikado, Hachioji, Japan

[73] Assignee: Nippon Television Industry Corporation, Tokyo, Japan

[21] Appl. No.: 735,395

[22] Filed: Oct. 26, 1976

[30] Foreign Application Priority Data

Jun. 25, 1976 [JP] Japan .................................. 51-75879
Oct. 28, 1975 [JP] Japan .................................. 50-130215

[51] Int. Cl.² .......................... H04N 5/30; H03K 4/00
[52] U.S. Cl. ...................................... 358/139; 328/14; 358/181
[58] Field of Search ........................ 358/139, 181, 182; 328/14

[56] References Cited

U.S. PATENT DOCUMENTS 3,586,755  6/1971  Wlasuk ................... 358/139
3,989,888  11/1976  Busch .................... 358/182

Primary Examiner—Howard W. Britton
Attorney, Agent, or Firm—Woodcock, Washburn, Kurtz & Mackiewicz

[57] ABSTRACT

Television signal generator includes a time constant circuit comprising a capacitor and resistors, and a control circuit for selecting resistance using the resistors. The generator generates a luminance signal having leading and trailing slopes at every leading and trailing edge of the signal in accordance with the angles of an outline of a desired pattern, shape and the like to the horizontal scanning lines of the signal, in response to the selection of resistance of the time constant circuit.

9 Claims, 23 Drawing Figures

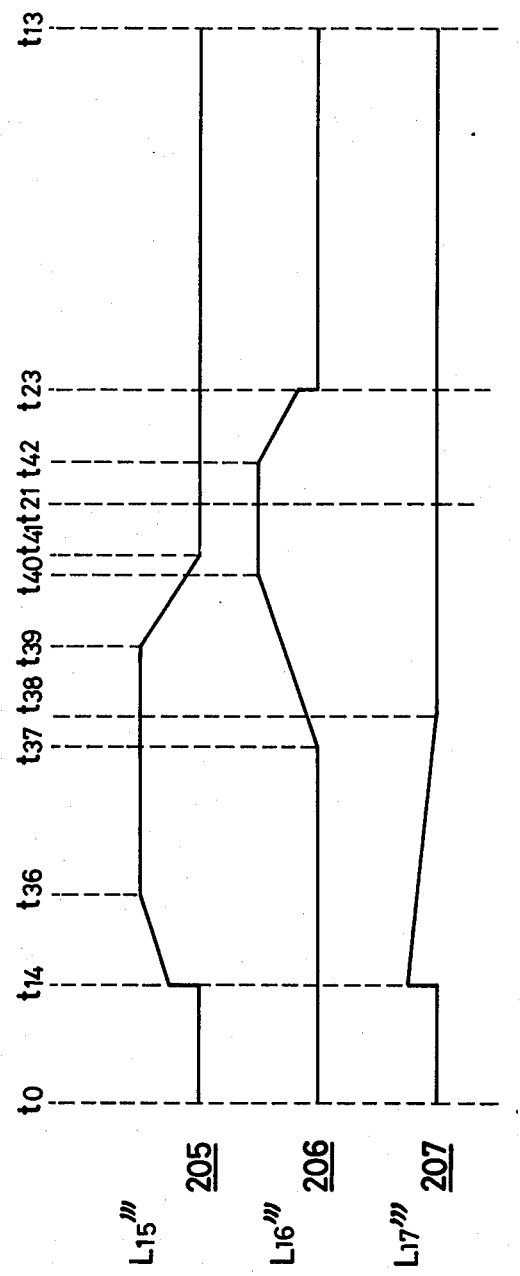

TELEVISION SIGNAL GENERATOR

BACKGROUND OF THE INVENTION

1. Field of the Invention:

This invention relates generally to a television signal generator. More particularly, the invention relates to a television signal generator in which a television test pattern signal or other television signal is generated using digital circuits. The signal may be used for resolution measurements of a television picture tube.

2. Description of the Prior Art:

A known television signal generator which produces a television signal using digital circuits has the disadvantage that an undesirable, stepped portion appears along the outline of the pattern or shape in the television picture reproduced from the signal, due to the digital waveform of the signal.

Moreover, since the signal consists of bipolar pulses which jump abruptly from one level to another, the picture cannot include portions representing an intermediate luminance level.

Another known television signal generator is used, which produces a television signal with an image pick-up tube or a monoscope tube. The waveform of the signal can be changed by adjusting the focus of the image pick-up tube or the monoscope tube. However, it is very difficult to control or adjust the degree of such focus adjustment to an exact value, so the pattern or shape reproduced from such a television signal on a picture tube cannot be accurately predetermined. Therefore, reliable measured values cannot be obtained.

SUMMARY OF THE INVENTION

Accordingly, it is an object of this invention to provide a television signal generator in which a television signal is produced using digital circuits for making a desired pattern or shape without a stepped edge along the outline thereof.

Another object of this invention is to provide a television signal generator in which a television signal is produced for reproducing a pattern or shape having an intermediate luminance level between black and white, whereby a pattern or shape without a stepped edge along the outline thereof can be produced with an intermediate luminance level.

A further object of this invention is to provide a television signal generator with which a television signal having abrupt leading or trailing edges, depending on the outline of a desired pattern or shape can be produced, whereby patterns and shapes of various forms can be reproduced.

A still further object of this invention is to provide a television signal generator in which an ideal waveform for reproducing a desired pattern or shape can be produced so as to increase the reliability of measured values in a digital measuring system, whereby conditions corresponding analogously to the degree of focus adjustment in a measuring system using a monoscope tube can be numerically specified.

According to this invention, there is provided a television signal generator comprising: a time constant circuit for changing the rise and fall times at every leading and trailing edge of a television signal for producing a desired pattern, shape and the like: and control means for selecting the time constant of the time constant circuit to have a predetermined value.

The above and other objects, features and advantages of this invention, will be apparent from the following detailed description of illustrative embodiments which are to be read in connection with the accompanying drawings.

BRIEF DESCRIPTION OF THE DRAWINGS

FIG. 16 is a waveform diagram showing television signals produced by the television signal generator of FIG. 4 when the wedge shapes are to be reproduced.

DESCRIPTION OF THE PREFERRED EMBODIMENTS

Figure 2:
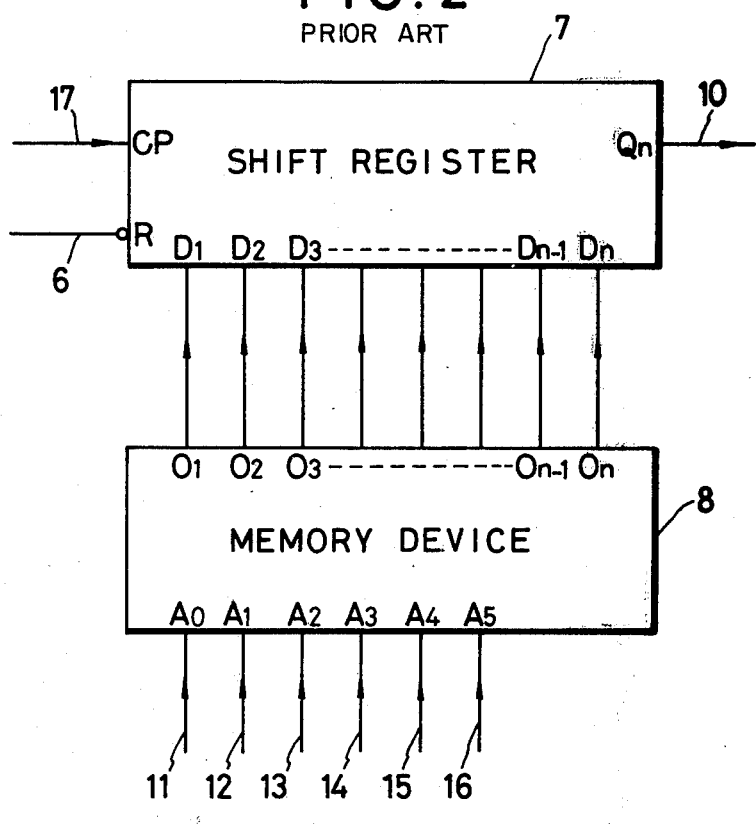
FIG. 2 is a block diagram of a known pattern signal generator.

The television signals generated by the known method using digital circuits, for example, a pattern signal generator as shown in FIG. 2, have the defect that stepped edges appear along the outline of the shape or pattern reproduced on a television picture tube with such television signals.

Figure 1:
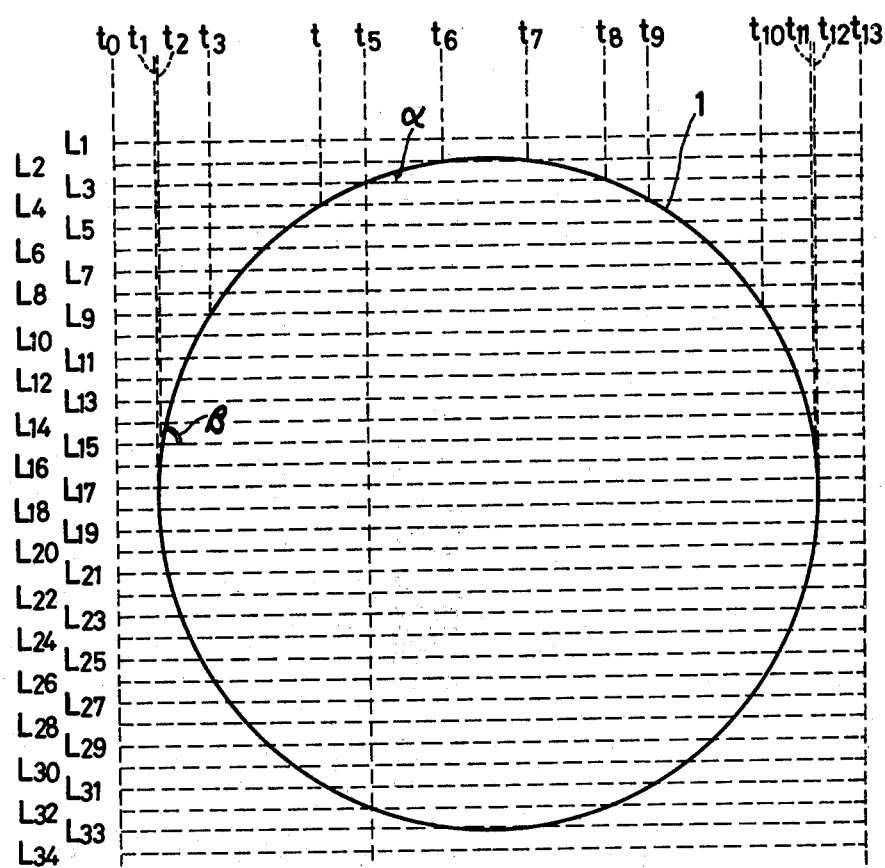
FIG. 1 is a view of a television picture representing an ideal circular shape.

By way of illustration, FIG. 1 shows a circular shape which is white with a black surround. In such a case the signals shown in FIG. 3, which result in noticeably stepped edges at the upper portion of the shape on the corresponding scanning lines $L_2$ to $L_4$, are generated by the above known method.

A preferred embodiment of this invention which removes this defect, will now be described with reference to the drawings.

Figure 4:
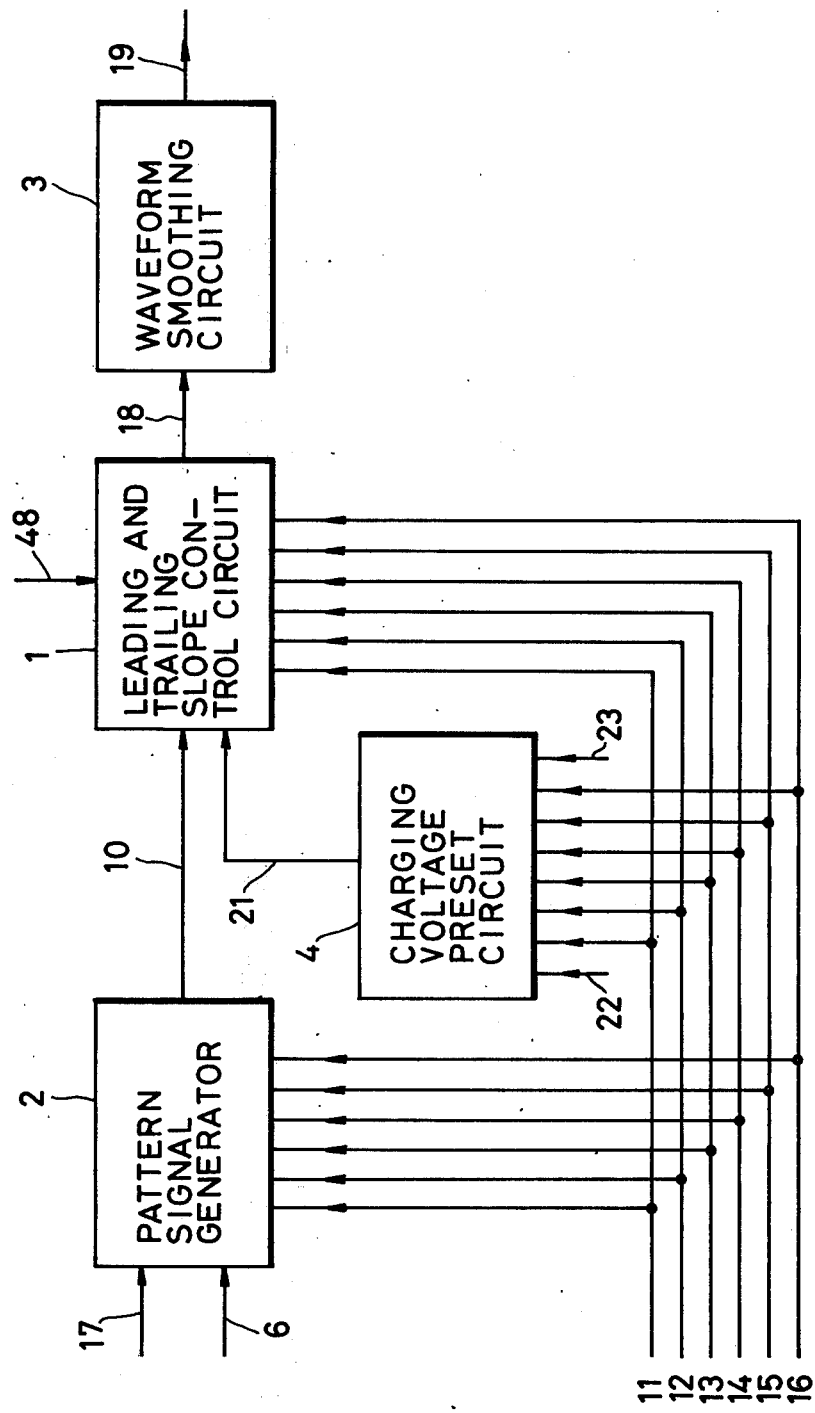
FIG. 4 is a block diagram of a television signal generator embodying the invention.

FIG. 4 is a block diagram showing a television signal generator according to the invention, which includes a leading and trailing slope control circuit 1, a pattern signal generator 2, a waveform smoothing circuit 3, and a charging voltage preset circuit 4. The pattern signal generator 2 supplies a pattern signal 10 to the slope control circuit 1.

The pattern signal generator 2, which is a known circuit as shown in FIG. 2, includes a parallel-input n-bit shift register 7 and a memory device 8 in which the pattern signal is memorized for each horizontal scanning line. The memory device 8 may be a read-only memory (ROM).

As shown in FIG. 2, binary coded line address signals 11 to 16 representing respective scanning line numbers are supplied to address input terminals $A_0$ to $A_5$ of the memory device 8. These line address signals 11 to 16 stimulate the memory device 8 to output the desired pattern signals, which are fed into the shift register 7. The parallel-input pattern signals are read out as pattern signal 10 in series from an output terminal Qn of the shift register 7. To read out, shift pulses are supplied to a clock terminal CP of the shift register 7 progressively to shift the contents therein. The shift pulses may be clock pulses synchronized with the horizontal synchronizing signals of the television signal. On completion of every shift, a horizontal driving pulse 6 is supplied as a reset pulse to a reset terminal R of the shift register 7 to clear the contents thereof at every scanning line.

Figure 5:
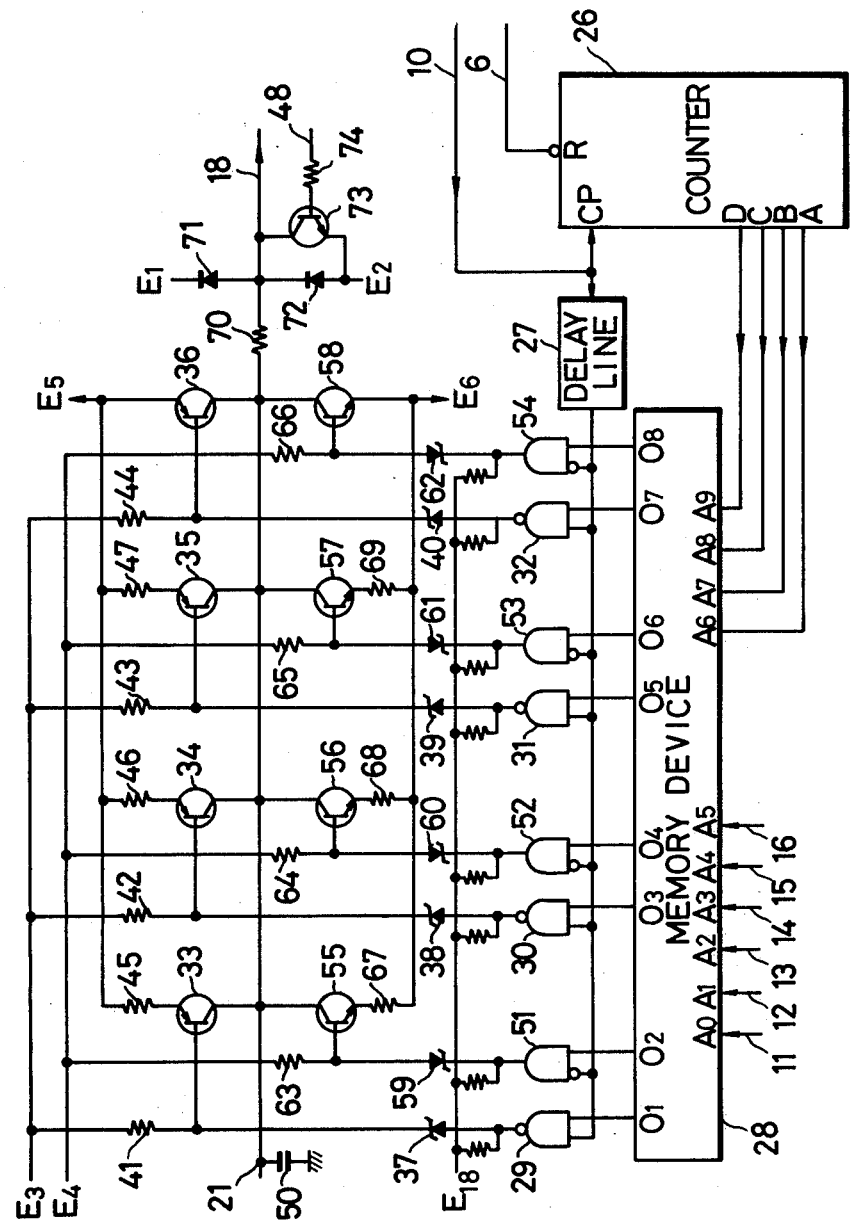
FIG. 5 is a circuit diagram of a leading and trailing slope control circuit in the generator of FIG. 4.

The circuit of the slope control circuit 1 is shown in FIG. 5, and includes a counter 26, a memory device 28, a time constant circuit comprising a capacitor 50 and resistors 45 to 47 and 67 to 69, and selecting means comprising transistors 33 to 36 and 55 to 58.

The pattern signal 10 produced at the pattern signal generator 2 of FIG. 2 is supplied to an input terminal CP of the counter 26 and to a delay line 27. Thus, the counter 26 counts pulses of the pattern signal 10 and produces binary counter signals representing the number of pulses in pattern signal 10 on every scanning lines. The binary count outputs composed of each $2^1$, $2^2$, $2^3$ and $2^4$ digits respectively are obtained at output terminals A, B, C and D. The outputs are supplied to address input terminals $A_6$ to $A_9$ of the memory device 28 as address signals. The binary coded line address signals 11 to 16 representing the scanning line numbers are supplied to other address input terminals $A_0$ to $A_5$ of the memory device 28.

The binary address combination at the address input terminals $A_0$ to $A_9$ determines the output condition at output terminals $O_1$ to $O_8$ of the memory device 28. The output signals from output terminals $O_2$, $O_4$, $O_6$ and $O_8$ set rise times at every leading edge of the desired television signal, and the output signals from the remaining output terminals $O_1$, $O_3$, $O_5$ and $O_7$ set fall times at each trailing edge of the television signal.

The output signals from the output terminals $O_1$, $O_3$, $O_5$ and $O_7$ are supplied to one input terminal of respective two-input NAND gates 29 to 32. The pattern signal 10 from the delay line 27 is supplied in common to each other input terminal of the NAND gates 29 to 32. Output signals of the NAND gates 29 to 32 are respectively applied to the bases of transistors 33 to 36, through Zener diodes 37 to 40. Moreover, the bases of the transistors 33 to 36 are connected to a dc supply $E_3$, through respective resistors 41 to 44. The emitters of the transistors 33 to 36 are connected to another dc supply $E_5$, through respective resistors 45 to 47, except for the emitter of the transistor 36 which is directly connected to the dc supply $E_5$. The collectors of the transistors 33 to 36 are connected to one terminal of the capacitor 50 in common with each other.

Accordingly, a low level (O) output from any of the NAND gates 29 to 32 puts the corresponding transistor 33, 34, 35 or 36 into the on state, with the remaining transistors held in the off state. The capacitor 50 is therefore charged through the transistor in the on state. The charging time constant is determined by the capacitance of the capacitor 50 and the resistance of the parallel combination of any of resistors 45 to 47 selected by the transistors in the on state. As a result, the potential across the capacitor 50 rises at a rate in accordance with the time constant determined by the output combination at output terminals $O_1$, $O_3$, $O_5$ and $O_7$ of the memory device 28. In a particular case, the capacitor 50 is charged substantially instantaneously up to a predetermined potential, because the emitter of the transistor 36 is directly coupled to the dc supply $E_5$, without any intervening resistors, when the transistor 36 is put into the on state.

On the other hand, the outputs from the output terminals $O_2$, $O_4$, $O_6$ and $O_8$ for setting the trailing slope of the television signal are applied to two-inputs AND gates 51 to 54, each of which has an inhibit input terminal. The pattern signal 10 from the delay line 27 is applied in common to each inhibit input terminal of AND gates 51 to 54 inversely. Outputs of these AND gates 51 to 54 are respectively applied to the bases of transistors 54 to 58, through Zener diodes 59 to 62. Further, the bases of the transistors 55 to 58 are connected to a dc supply $E_4$, through respective resistors 63 to 66. The emitters of the transistors 55 to 58 are connected to another dc supply $E_6$, through respective resistors 67 to 69, except the emitter of transistor 56 which is directly connected to a dc supply $E_6$. The collectors of the transistors 55 to 58 are connected to one terminal of the capacitor 50 in common with each other.

Accordingly, low level (O) outputs from any of AND gates 51 to 54 put the corresponding transistors 55 to 58 into the on state, with the remaining transistors held in the off state. The capacitor 50 is thus discharged through the transistors which are in the on state. The discharging time constant is determined by the capacitance of the capacitor 50 and the resistance of the parallel combination of any of resistors 67 to 69 selected by the transistors which are in the on state. As a result, the potential of the capacitor 50 falls at a rate determined by the output combination at output terminal $O_2$, $O_4$, $O_6$ and $O_8$ of the memory device 28. In a particular case, the capacitor 50 is discharged substantially instantaneously down to a predetermined potential, because the emitter of the transistor 58 is directly coupled to the dc supply $E_6$, without any intervening resistors, when the transistor 58 is put into the on state.

Upon the above-mentioned operations, the pattern signal 10 delayed by the delay line 27 is directly applied to the NAND gates 29 to 32 in the leading slope control circuit without inversion, while on the contrary, the pattern signal 10 is inversely applied to the AND gates 51 to 54 in the trailing slope control circuit. Accordingly, the transistors 55 to 58 which determine the trailing slope are all in the off state when the leading edge is applied, while the transistors 33 to 36 which determine the leading slope are all in the off state when the trailing edge is applied. On operation of the slope control circuit 1, the delay line 27 functions to match the pattern signal 10 with the outputs of the memory device 28, in timing.

The voltage across the capacitor 50 is led out as an output signal 18 through a resistor 70 and a limiting circuit comprising diodes 71 and 72. The limiting circuit keeps the output signal 18 within upper voltage $E_1$ applied to the cathode of the diode 71 and lower voltage $E_2$ applied to the anode of the diode 72. When the level of the output signal 18 is more than voltage $E_1$, the diode 71 conducts to limit the signal level. On the contrary, when the output signal 18 is less than voltage $E_2$, the diode 72 conducts to maintain the signal level.

A transistor 73 is connected to the output of the slope control circuit 1. The transistor 73 is employed to cut out the unwanted trailing portion of the output signal 18. At such unwanted trailing portion, a pulse signal 48 is applied to the base of the transistor 73 through a resistor 74, putting the transistor 73 into the on state. That causes the output signal 18 to fall to the potential $E_2$, which removes the unwanted trailing portion of the output signal 18. The pulse signal 48 may be, for example, a signal 203 of the scanning line $L_{18''}$ as shown in FIG. 14B, when a television signal 190 on the scanning line $L_{18''}$ is desired as the output signal 18. The pulse signal 48 (the signal 203) can be generated in the same way with the generation of pattern signal 10 as in the pattern signal generator 2 referred to above.

Figure 6A:
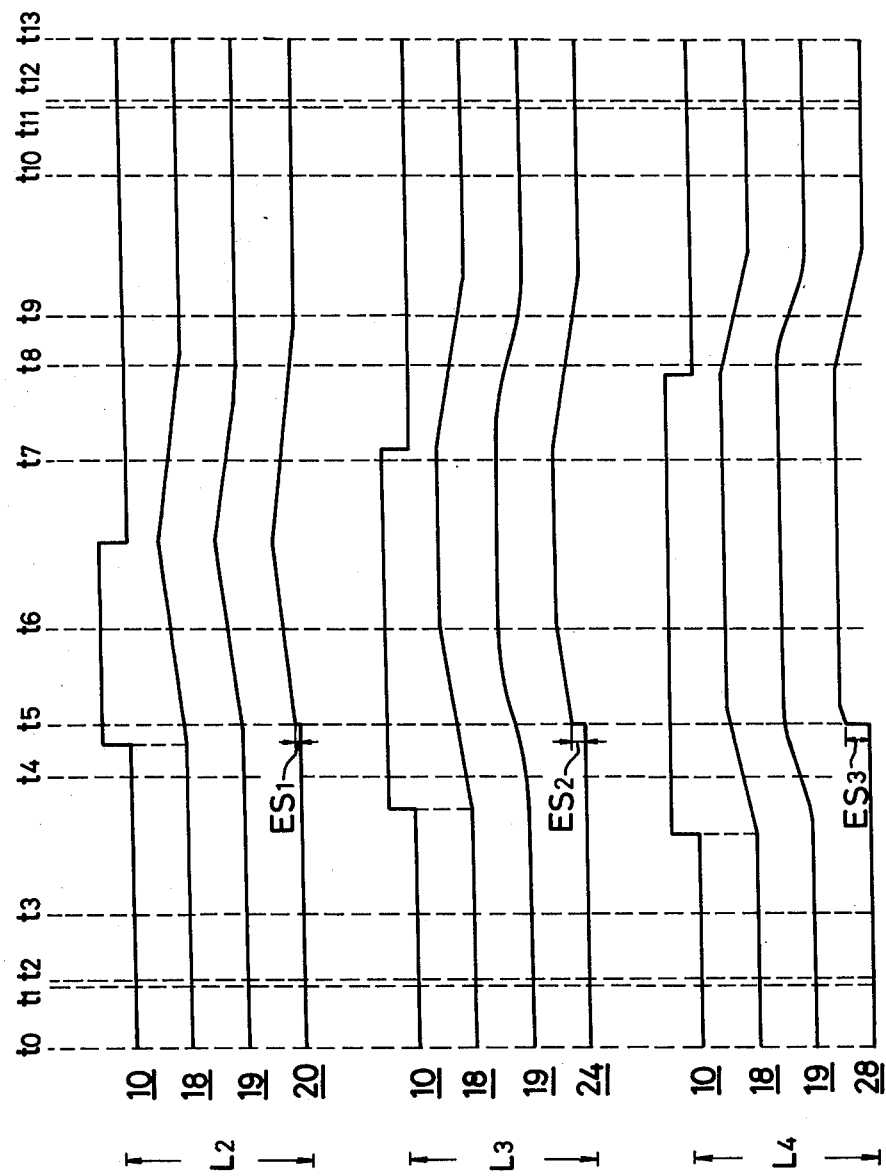
FIGS. 6A and 6B are waveform diagrams for explaining the operation of the circuit blocks of FIG. 4 when the circular shape of FIG. 1 is to be reproduced.
Figure 6B:
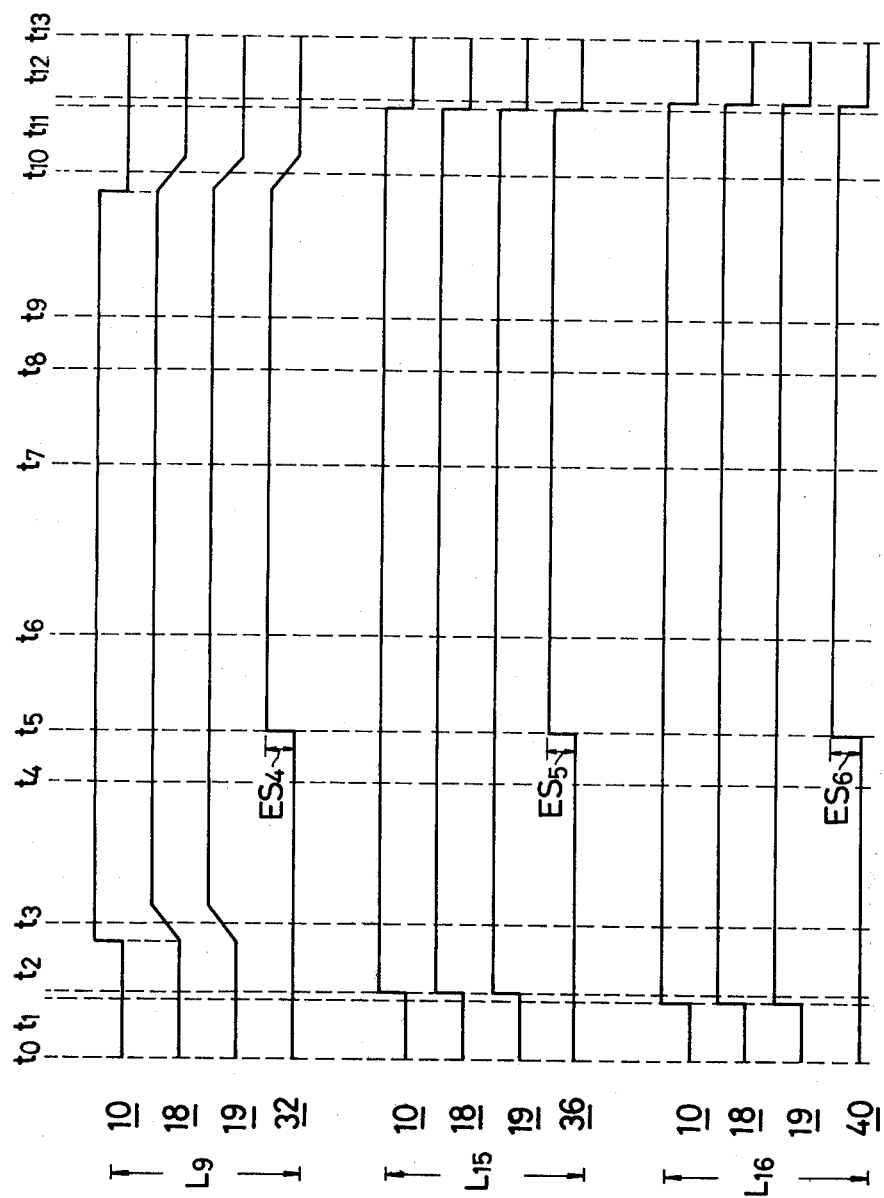

FIGS. 6A and 6B show examples of the desired output signal 18, to be produced by the television signal generator when the circular shape in FIG. 1 is to be reproduced on the picture.

Referring first to the scanning line $L_2$ shown in FIG. 1, the corresponding output signal for line $L_2$ is shown by a signal 18 in FIG. 6A. As can be seen by comparing the signal 18 and the corresponding signal 9 of line $L_2$ in FIG. 3 which is produced by conventional methods, the signal 9 changes abruptly by a step at the times $t_6$ and $t_7$, but the signal 18 rises and falls gently with sloped portions near the times $t_6$ and $t_7$. The gradients of the leading and trailing sloped portions may be determined as follows.

Taking the case of the circular shape of FIG. 1, it is desirable that the television signal has relatively short rise and fall times at the leading and trailing portions, as typically shown by the signals 18 for the scanning line $L_{15}$ and $L_{16}$ in FIG. 6B when the angle of the outline of the shape to the scanning line is relatively large, like angle $\beta$ shown on FIG. 1 in relation to the scanning line $L_{15}$. In contrast with this, it is desirable that the television signal has relatively a long rise or fall time, as typically shown by the signals 18 for the scanning lines $L_2$ to $L_4$ and $L_9$ in FIGS. 6A and 6B, when the angle of the outline of the shape to the scanning line is relatively small, like angle $\alpha$ shown on FIG. 1 in relation to the scanning line $L_3$. The leading or trailing slope may be determined in dependence on the angle of the outline to the scanning line.

The leading or trailing slope of the television signal results in gradual increase or decrease of luminance level near the edge of the pattern or shape. The gradual increase or decrease gives smooth transition from one line component to the next line component composing the pattern or shape. As a result, a continuous outline is reproduced.

Figure 7:
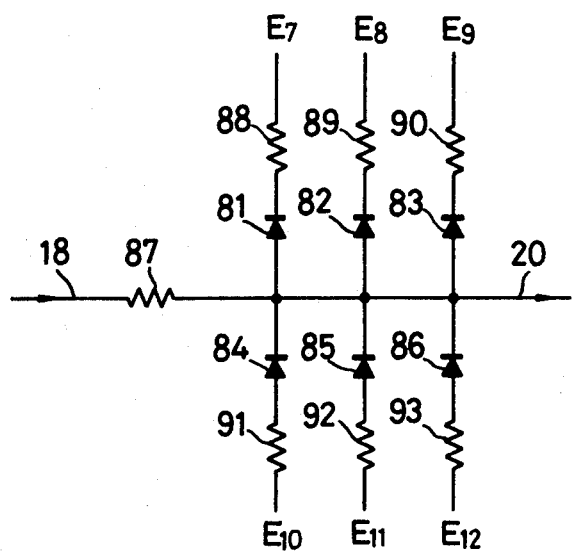
FIG. 7 is a circuit diagram of a waveform smoothing circuit in the generator of FIG. 4.

The output signal 18, like those shown in FIGS. 6A and 6B produced by the slope control circuit 1, is applied to the waveform smoothing circuit 3 in FIG. 4. The smoothing circuit 3 comprises diodes 81 to 86 and resistors 87 to 93, which are connected as shown in FIG. 7. Positive dc supplies $E_7$, $E_8$ and $E_9$ are respectively supplied to each anode of the diodes 81 to 83 through the resistors 88 to 90. Negative dc supplies $E_{10}$, $E_{11}$ and $E_{12}$ are respectively supplied to each cathode of the diodes 84 to 86 through resistors 81 to 93. When the level of the output signal 18 is set to vary within the range from $-5V$ to $+5V$, the dc supplies $E_7$ to $E_{12}$ are arranged to supply potentials $+4V$, $+3V$, $+2.5V$, $-2.5V$, $-3V$ and $-4V$, respectively.

If the signal 18 is in the range $+2.5V$ to $+3V$ the diode 83 turns on, and remaining diodes 81, 82, 84, 85 and 86 are held in the off state. As a result, a signal 19 is led out at the level determined by the resistors 87 and 90 between the potentials of signal 18 and the dc supply $E_9$. Further, when the signal 18 is in the range $+3V$ to $+4V$, the diodes 82 and 83 are in the on state and the diodes 81, 84, 85 and 86 are in the off state, and a signal 19 is led out at the level determined by the resistor 87 and the parallel resistors 89 and 90, in the same manner as above. Thus, the signal 19 varies smoothly, in contrast to the original signal 18 having linear slopes. For example, when signals 18 of FIG. 6A are applied to the waveform smoothing circuit 3 in FIG. 7, smoothed signals 19 as shown in FIG. 6A, can be obtained.

Figure 8:
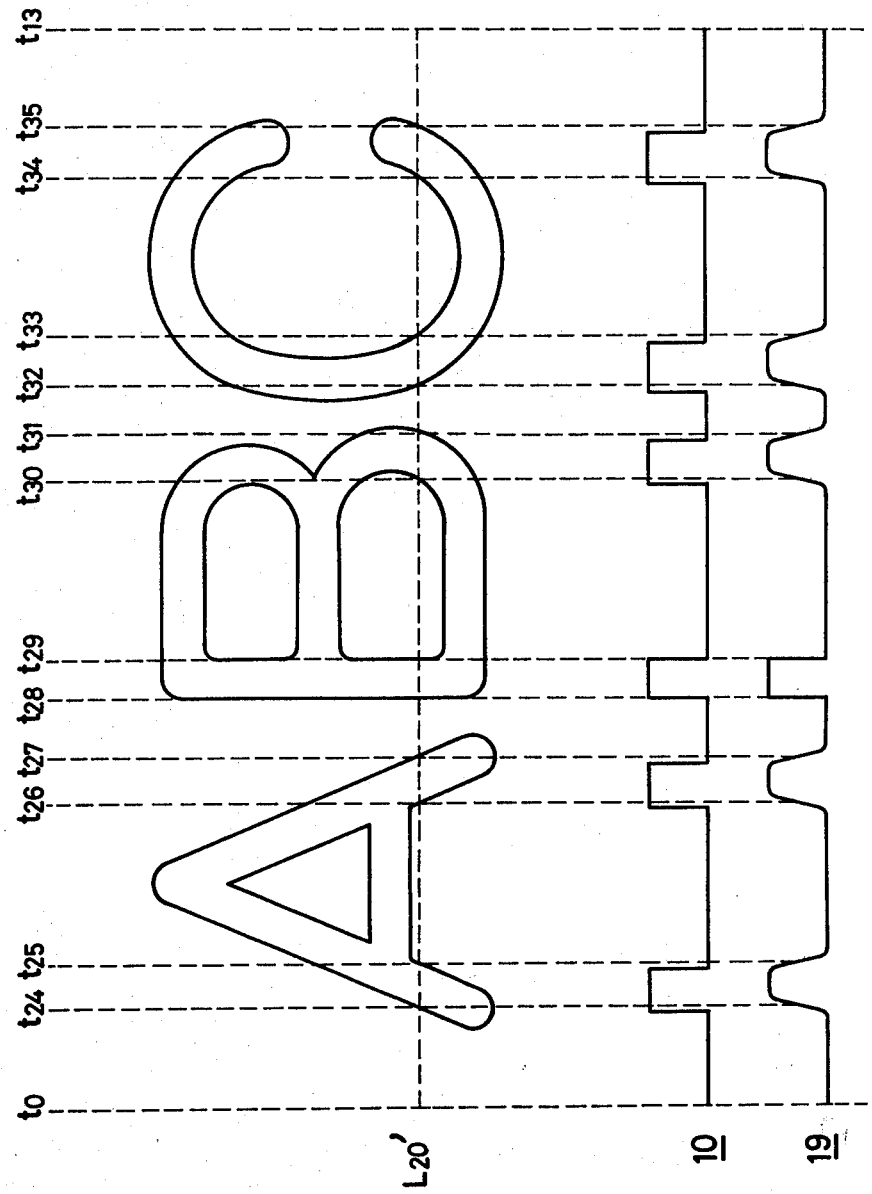
FIG. 8A is a view of a television picture representing ideal letter patterns "A B C"
FIGS. 8B to 8C are waveform diagrams showing television signals produced by the circuit blocks of FIG. 4 when the letter patterns of FIG. 8A are to be reproduced, explaining the correspondence between the patterns and the signals.

FIGS. 8A to 8C show another example, where letter patterns "A B C" are desired on the television picture. The television signal for these patterns is produced by the leading and trailing slope control circuit 1 and waveform smoothing circuit 3. The following explanation is given in relation to the scanning line $L_{20}'$.

First, a pattern signal 10 shown in FIG. 8B is produced in the pattern signal generator 2 of FIG. 2, then, the pattern signal 10 is applied to the slope control circuit 1 to give appropriate slopes to every leading and trailing edge of the pattern pulses. The output signal 18 from the slope control circuit 1 is applied to the waveform smoothing circuit 3, which smooths the output signal 18 into the waveform shown in FIG. 8C.

Next, another example, where a segment shape on the right of the time $t_5$ in FIG. 1 is desired to be reproduced on the television picture, will be described.

In such case, as shown in FIG. 4, a signal 21 from the charging voltage preset circuit 4 is applied to the slope control circuit 1, in order to give an initial charging voltage to the capacitor 50. When such a segment is on the picture, the television signals must instantaneously rise to initial voltages, for example, $ES_1$, $ES_2$ ... $ES_6$, at the time $t_5$ as shown in FIGS. 6A and 6B. The charging voltage preset circuit 4 for setting these initial voltages $ES_1$, $ES_2$, ... $ES_6$, is illustrated in FIG. 9.

Figure 9:
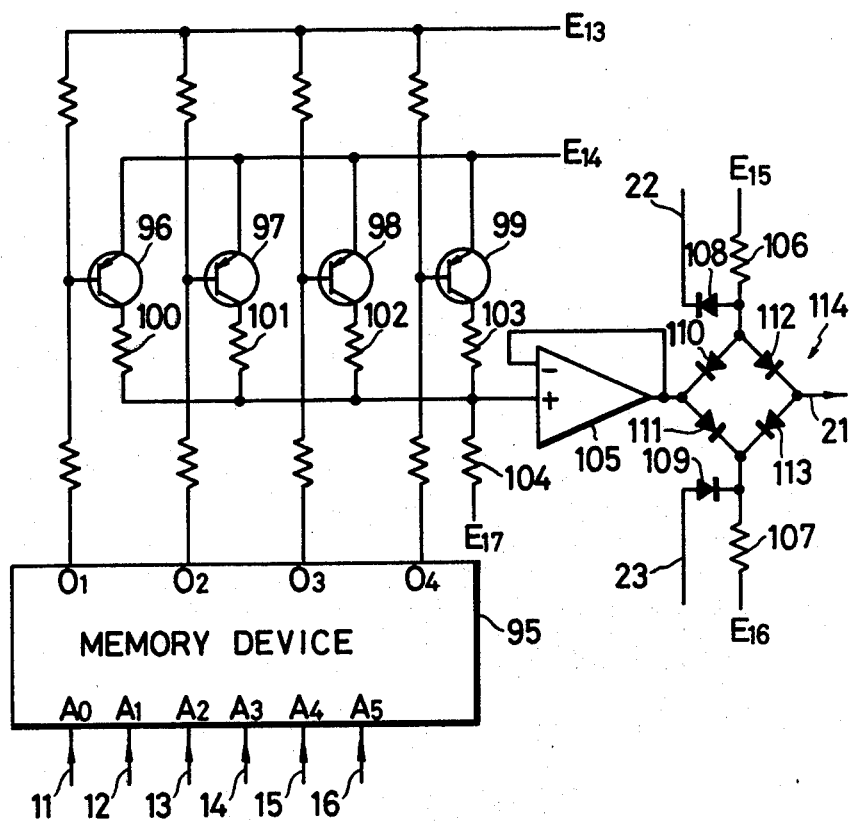
FIG. 9 is a circuit diagram of a charging voltage preset circuit in the generator of FIG. 4.

Referring to FIG. 9, information is stored in a memory device 95, to designate the charging voltage at the initial, final or intermediate moment in the leading or trailing portion of the television signal like the initial voltages $ES_1$, $ES_2$ ... $ES_6$. Similarly to the memory devices 8 and 28 of FIG. 2 and FIG. 5, the binary coded line address signals 11 to 16 representing the scanning line number are supplied to address input terminals of the memory device 95. Outputs at output terminals $O_1$ to $O_4$ of the memory device 95 are applied to the base of each transistor 96 to 99. Accordingly, any low level output (O) at the output terminals $O_1$ to $O_4$ puts the corresponding transistor 96 to 99 into the on state. For example, when the output terminal $O_1$ is at low level, the transistor 96 turns on, producing a voltage divided by resistors 100 and 104 between potentials of dc supplies $E_{14}$ and $E_{17}$. The divided voltage is applied to the + terminal of an operational amplifier 105, which operates as a voltage follower circuit for impedance conversion.

The output of the operational amplifier 105 is applied to a switching circuit 114 composed of resistors 106 and 107 and diodes 108 to 113. A positive dc supply $E_{15}$ and a negative dc supply $E_{16}$ are supplied for the switching circuit 114. When a sufficiently high level signal 22 able to turn off the diode 108 is supplied to the anode thereof and a sufficiently low level signal 23 able to turn off the diode 109 is supplied to the cathode thereof, both diodes 112 and 113 are put into the on state. At that time, either the diode 110 or 111 goes on in accordance with the potential of the output of the operational amplifier 105. Therefore, in such condition, the output voltage of the amplifier 105 can pass the switching circuit 114 and is supplied to the capacitor 50 in the leading and trailing slope control circuit 1.

On the contrary, when a high level signal 23 which turns on the diode 109 is higher than a low level signal 22 which turns on the diode 108, the diodes 112 and 113 are put into the off state. At least one of the diodes 110 and 111 then goes off in accordance with the potential of the output of the operational amplifier 105. As a result, in such condition, the output voltage of the amplifier 105 is cut off by the switching circuit 114.

The signals 22 and 23 which control the switching circuit 114, may be relatively instantaneous pulses at a desired initial, final or intermediate moment in the leading or trailing portion of the television signal. Such pulse signals can be similarly formed in the like manner as the pattern signal with a memory device. Alternatively, they may be derived by differentiating the leading edge of the above-mentioned signal 48, for example, signal 203 of the scanning line $L_{18''}$ in FIG. 14B.

The output signal 21 of the switching circuit 114 is applied to the capacitor 50 in the slope control circuit 1 to charge the capacitor 50. The time constant on charging the capacitor 50 through the switching circuit 114 is sufficiently small relative to the time constants which give the leading or trailing slopes, to enable the initial voltage of the capacitor 50 to be preset relatively instantaneously. As a result, signals 24 having initial charging voltages as shown in FIGS. 6A and 6B, are formed.

Next, another modification of the leading and trailing slope control circuit 1 in FIG. 4 will be described with reference to FIG. 10.

As with the circuit shown in FIG. 5, the pattern signal 10 formed in the pattern signal generator 2 of FIG. 2 is supplied to an input terminal CP of a counter 121. The counting outputs of the counter 121 in binary from are applied to address input terminals $A_6$ to $A_9$ of a memory device 122. To other address input terminals $A_0$ to $A_5$, binary coded line address signals 11 to 16 designating the scanning line number are supplied. A reset signal synchronized with the horizontal synchronizing signal of the television signal is applied to a reset terminal R of the counter 121 to clear the contents at the end of every horizontal scan. The memory device 122 may be a read-only memory. Information stored in the memory device 122 is read out through output terminals $O_1$ to $O_4$ and $O_9$ to $O_{12}$ in accordance with the binary address combination at the address input terminals $A_0$ to $A_9$. The information at the output terminals $O_1$ to $O_4$ specifies the desired leading slopes at every leading edge of the television signal, and the information at the output terminals $O_9$ to $O_{12}$ specifies the trailing slopes.

The outputs at the output terminals $O_1$ to $O_4$ are respectively applied to the bases of the transistors 131 to 134, through buffer amplifiers 123 to 126 of open-collector type and resistors 127 to 130. The transistors 131 to 134 are put into the off state with high level outputs (1) at the output terminals $O_1$ to $O_4$, and are put into the on state with low level outputs (0) thereat. Any of transistors 121 to 134 in the on state couples corresponding resistors 135 to 138 connected to the emitters thereof, to the connecting point A of a diode gate circuit 170 comprising diodes 161 to 164. To the connecting point B of the diode gate circuit 70, the pattern signal 10 from the pattern signal generator 2 is applied, through an emitter-follower circuit composed of a transistor 157 and a resistor 159, after being delayed by a delay line 139.

On the other hand, the outputs at the output terminals $O_9$ to $O_{12}$ are respectively applied to the bases of transistors 141 to 144 functioning as buffer amplifiers. The collector of each transistor 141 to 144 is connected to the base of each transistor 149 to 152, respectively, through resistors 140 to 148. With high level output (1) at the output terminal $O_9$ to $0_{12}$, the transistors 141 to 144 are put into the off state, which turns the transistors 149 to 152 off. On the contrary, with low level output (O), the transistors 141 to 144 are put into the on state, which turns the transistors 149 to 152 on.

Any of transistors 149 to 152 in the on state couples the respective one of the resistors 153 to 156 connected to its emitter to a connecting point D of the diode gate circuit 170.

The resistances of the resistors 135 to 138 and 153 to 156 are determined in accordance with binary coded weighting. Thus if the resistance of the resistors 135 and 153 is 8r, the resistors 136 and 154 are 4r, the resistors 137 and 155 are 2r, and the resistors 138 and 156 are r.

The connecting point C of the diode gate circuit 170 is connected to one terminal of a capacitor 165, whose other terminal is grounded. The voltage at the terminal is led out through an emitter-follower circuit composed of a transistor 158 and a resistor 160.

Next, operation of the circuit shown in FIG. 10 will be described. The circuit has the same function as the leading and trailing slope control circuit 1 in FIG. 4 shown in FIG. 5.

The pattern signal 10 formed in the pattern signal generator 2 of FIG. 2 is applied to the input terminal CP of the counter 121, which counts pulses of the pattern signal 10. The counting outputs are applied to the address input terminals $A_6$ to $A_9$ of the memory device 122, which outputs the information signals designating the leading and trailing slopes, from the output terminals $O_1$ to $O_4$ and $O_9$ to $O_{12}$.

At the leading edge, provided that the output terminals $O_1$ and $O_2$ are at high level (1) and the output terminals $O_3$ and $O_4$ are at low level (0), the transistors 131 and 132 turn off and the transistors 133 and 134 turn on as described above. In such condition, an equivalent circuit where the connecting point A of the diode gate circuit 170 is coupled to positive dc supply (+12V) through a parallel circuit of the resistors 137 and 138, appears. As a result, the capacitor 165 is charged through the resistors 137 and 138 and the diode 162. The charging time constant is given by the parallel resistance ($2r/3$) of the resistors 137 and 138 and the capacitance of the capacitor 165.

The charging of the capacitor 165 starts synchronously with the rise of the pattern signal 10 which is applied to the connecting point B through the delay line 139 and the transistor 157, because, when the pattern signal 10 is at low level, the potential of the connecting point A is being clamped to the low potential of the connecting point B through the diode 161, resulting in the off state of the diode 162.

At the trailing edge, provided that the output terminals $O_9$ and $O_{10}$ are at high level (1) and the output terminals $O_{11}$ and $O_{12}$ are at low level (0), the transistors 149 and 150 turn off and the transistors 151 and 152 turn on as described above. In such condition, an equivalent circuit where the connecting point D of the diode gate circuit 170 is coupled to negative dc supply (−12V) through a parallel circuit of the resistors 155 and 156, appears. As a result, the capacitor 165 is discharged through the resistors 155 and 156 and the diode 164. The discharging time constant is given by parallel resistance ($2r/3$) of the resistors 155 and 156 and capacitance of the capacitor 165.

The discharging of the capacitor 165 starts synchronously with the fall of the signal 10 which is applied to the connecting point B through the delay line 139 and the transistor 157, because, when the pattern signal 10 is at high level, the potential of the connecting point D is being clamped to the high potential of the connecting point B through the diode 163, resulting in the off state of the diode 164.

The terminal voltage of the capacitor 165 is led out as an output signal 18 through the emitter-follower circuit composed of the transistor 158 and resistor 160. The signal 18 is applied to the waveform smoothing circuit 3 shown in FIG. 7, from which a smoothed television signal 20 is obtained. As occasion demands, the output signal 21 from the charging voltage preset circuit 4 in FIG. 9 may be supplied to the capacitor 165 to give an initial charging voltage.

Next, a further modification of the leading and trailing slope control circuit 1 in FIG. 4 will be described with reference to FIG. 11. In FIG. 11, the parts which correspond to the parts in the circuit of FIG. 10, are denoted by the same reference numerals, and are not described in detail hereinafter.

In this modification shown in FIG. 11, a contour pulse signal 10′ is applied to the input terminal CP of the counter 121. Such contour pulse signal 10′ includes the pulses at positions corresponding to the outline of a pattern or shape to be reproduced on the television picture. The contour pulse signal 10′ may be produced in the same way with the pattern signal 10 formed by the pattern signal generator 2 of FIG. 2.

The counting outputs of the counter 121 in binary form are applied to the address input terminals $A_6$ to $A_9$ of the memory device 12. To other address input terminals $A_0$ to $A_5$, the binary coded line address signals 11 to 16 designating the scanning line number are supplied.

Information stored in the memory device 122 is read out through output terminals $O_1$ to $O_{12}$ in accordance with the binary address combination at the address input terminals $A_0$ to $A_9$. The output information obtained at the output terminals $O_1$ to $O_4$ gives the leading slopes, that obtained at the output terminals $O_5$ to $O_8$ gives the signal levels, and that obtained at the output terminals $O_9$ to $O_{12}$ gives the trailing slopes, for the desired television signal. The outputs at the terminals $O_1$ to $O_4$ and $O_9$ to $O_{12}$ of the memory device 122 operate the circuit in the same manner with circuit of FIG. 10.

The outputs at the terminals $O_5$ to $O_8$ are applied to a digital to analog (D - A) converter 140, and is converted into a multi-level signal. The output signal 25 of the D - A converter 140 is applied to the connecting point B through the emitter-follower circuit composed of the transistor 157 and the resistor 159.

Figure 11:
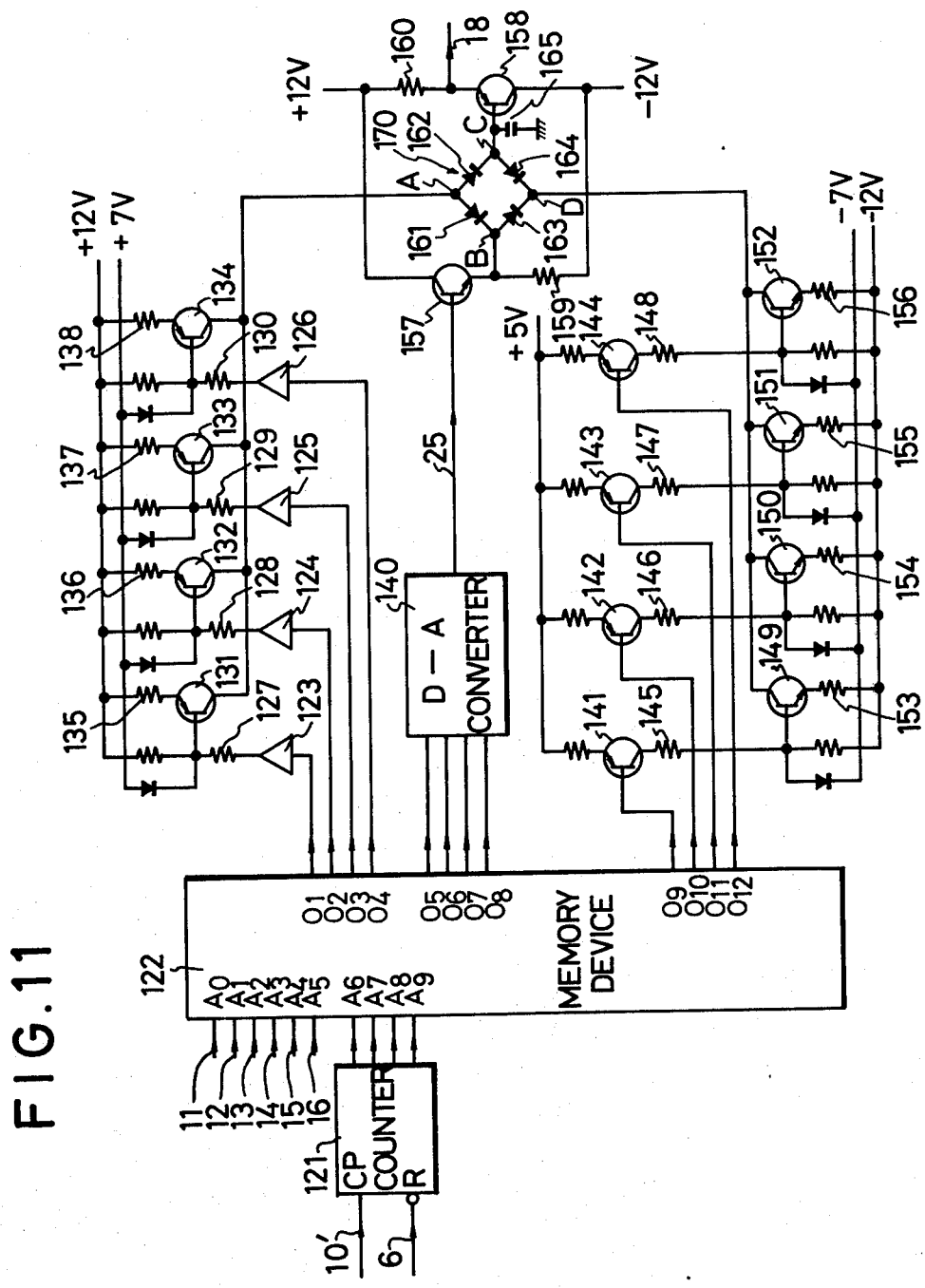
FIG. 11 is a circuit diagram showing another modified version of the leading and trailing slope control circuit for the generator of FIG. 4.
Figures 12A, 12B, 12C, 12D:
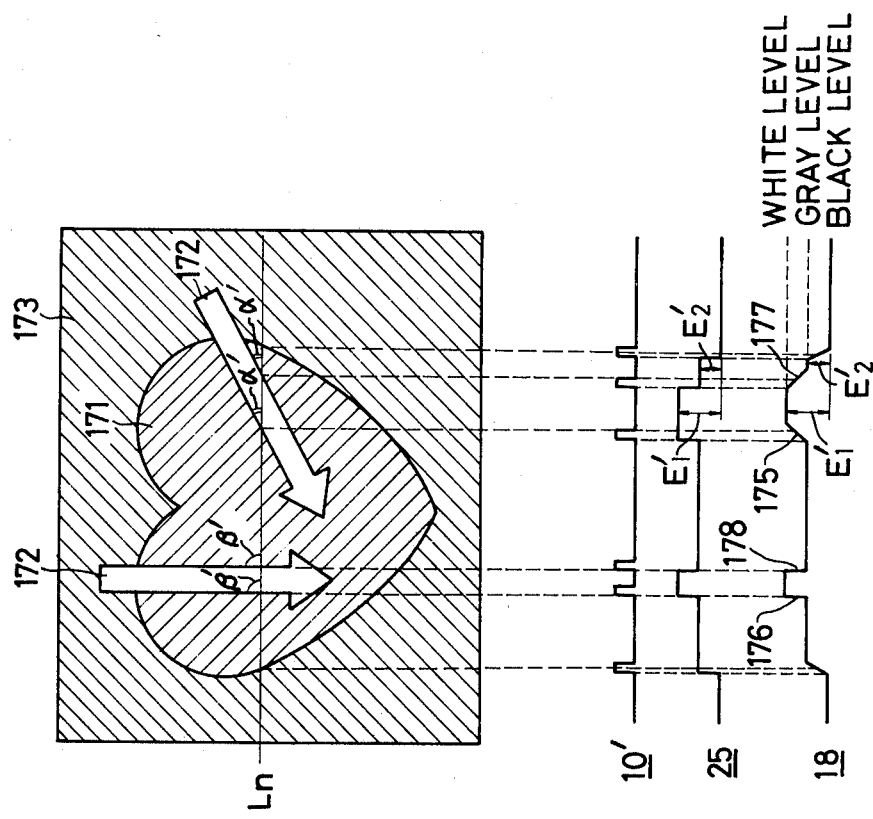
FIG. 12A is a view of a television picture representing another pattern produced by the use of the leading and trailing slope control circuit of FIG. 11.
FIGS. 12B to 12D are waveform diagrams at points of the leading and trailing slope control circuit of FIG. 11.

Next, the operation of the circuit of FIG. 11 will be described in relation to an example where a pattern shown in FIG. 12A is desired on the picture. Reference is made to the scanning line $L_n$ of FIG. 12A and corresponding signals in FIGS. 12B, 12C and 12D.

The pattern of FIG. 12A includes a heart-shape 171 colored grey with 50% luminance and two white arrow-shapes 172, on a black background 173. The contour pulse signal 10′ having pulses at the positions corresponding to the outlines of each shape as shown in FIG. 12B, is applied to the input terminal CP of the counter 121. Pulses in the signal 10′ are counted in the counter 121. The counter outputs are applied to the address input terminals $A_6$ to $A_9$ of the memory device 122. Then, the memory device 122 provides the information specifying the leading slopes, trailing slopes, and voltage levels of the television signal at every contour line of the shapes 171 and 172, from the output terminals $O_1$ to $O_{12}$ thereof.

Figure 10:
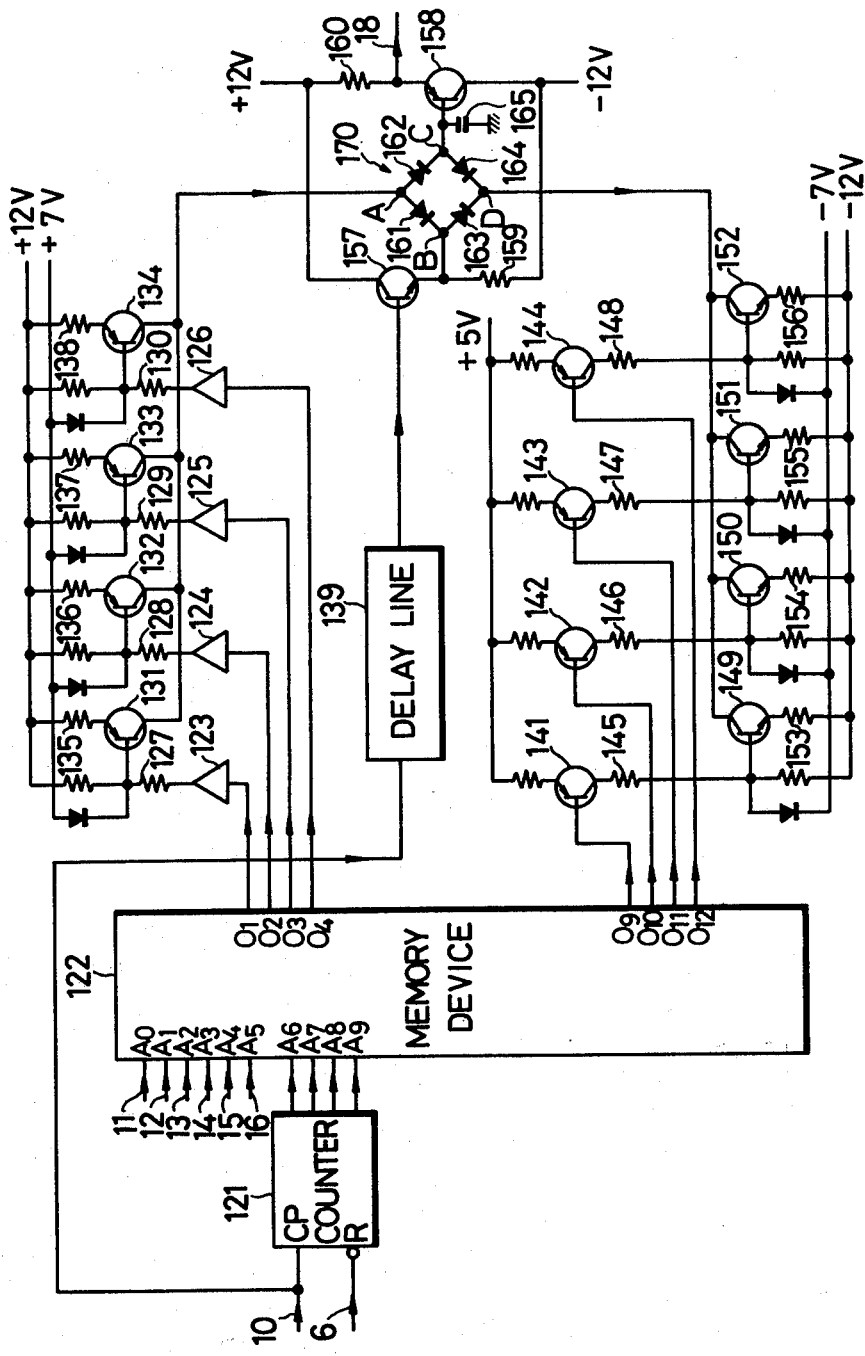
FIG. 10 is a circuit diagram showing a modified version of the leading and trailing slope control circuit for the generator of FIG. 4.

As in the operation of the circuit of FIG. 10, the outputs at the output terminals $O_1$ to $O_4$ fix the charging time constant to provide an appropriate leading slope. At that time, when the output of the D - A converter 140 is at the potential $E_1$ in response to the outputs of the terminals $O_5$ to $O_8$ of the memory device 122, the potential of the connecting point A is clamped to the potential $E_1$ through the diode 161. As a result, the charging voltage of the capacitor 165 which is charged from the connecting point A through the diode 162 is limited to the potential $E_1$.

Moreover, as in the operation of the circuit of FIG. 10, the outputs at the output terminals $O_9$ to $O_{12}$ fix the discharging time constant to provide an appropriate trailing slope. At that time, when the output of the D - A converter 140 is at the potential $E_2$ in response to the outputs of the terminals $O_5$ to $O_8$ of the memory device 122, the potential of the connecting point D is clamped to the potential $E_2$ through the diode 163. As a result, the voltage of the capacitor 165 which discharges through the diode 164 towards the connecting point D is limited to the potential $E_2$.

As a result of the above operation, television signal 18 of which the leading and trailing slopes and signal levels are desirably provided, is obtained from the connecting point C, as shown in FIG. 12D. On such operation, the output signal of the D - A converter 140 is a signal 25 having the waveform shown in FIG. 12C Then, the signal 18 is supplied for the waveform smoothing circuit 3 of FIG. 7, from which a smoothed signal 20 can be obtained as described above.

Regarding the selection of the leading and trailing slopes, it is desirable that the television signal has a relatively long rise or fall time, like the leading and trailing slopes 175 and 177 in the waveform of FIG. 12D, when the angle of the outline of the shapes 171 and 172 to the scanning line is relatively small, like $\alpha'$ shown in FIG. 12A.

In contrast with above, it is desirable that the television signal has a relatively short rise or fall time, like the leading and trailing slopes 176 and 178 in the waveform of FIG. 12D, when the angle of the outline to the scanning line is relatively large, like $\beta'$ shown in FIG. 12A.

Figure 13:
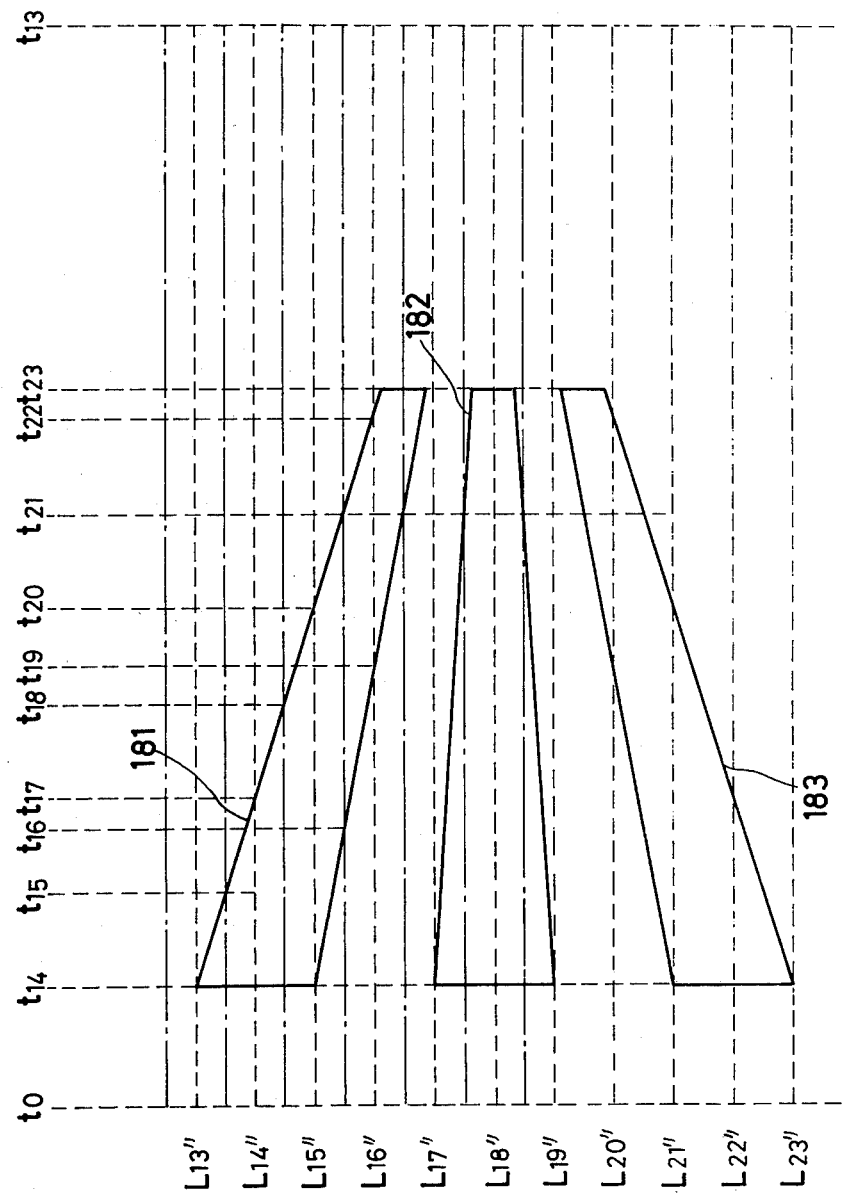
FIG. 13 is a view of a television picture representing ideal wedge shapes for use in vertical resolution measurement of the picture tube.

The television signal generator described in the above embodiments is particularly useful when wedge shapes as shown in FIG. 13 are required for use in vertical resolution measurement of a picture tube of a television receiver. As shown for example by wedge shape 182, the shape has a gradual variation of width along the scanning line so that the wedge shape 182 occupies two scanning lines at the time $t_{14}$ and one scanning line at the time $t_{21}$.

Figure 14A:
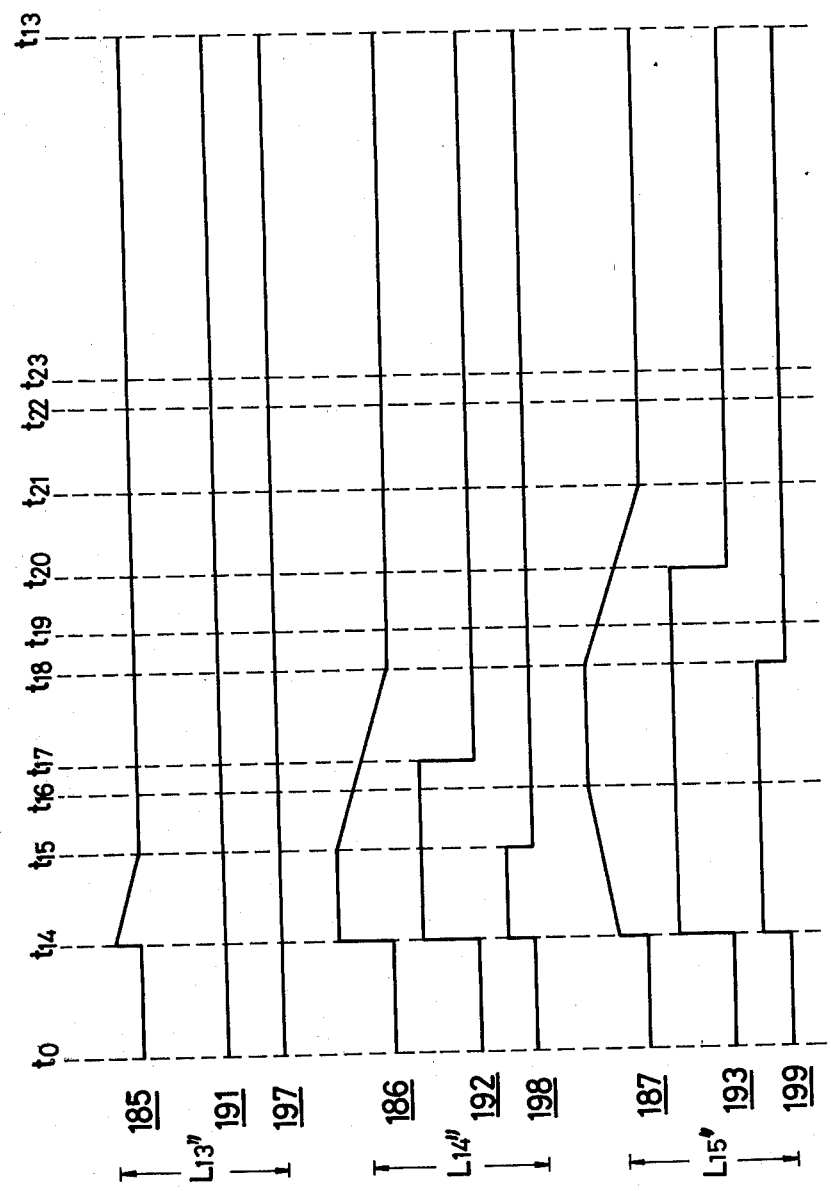
FIGS. 14A and 14B are waveform diagrams showing television signals produced by the known method with the pattern signal generator of FIG. 2 and with the television signal generator of this invention respectively, when the wedge shapes for use in vertical resolution measurement are desired to be on the picture, for comparison between them.
Figure 14B:
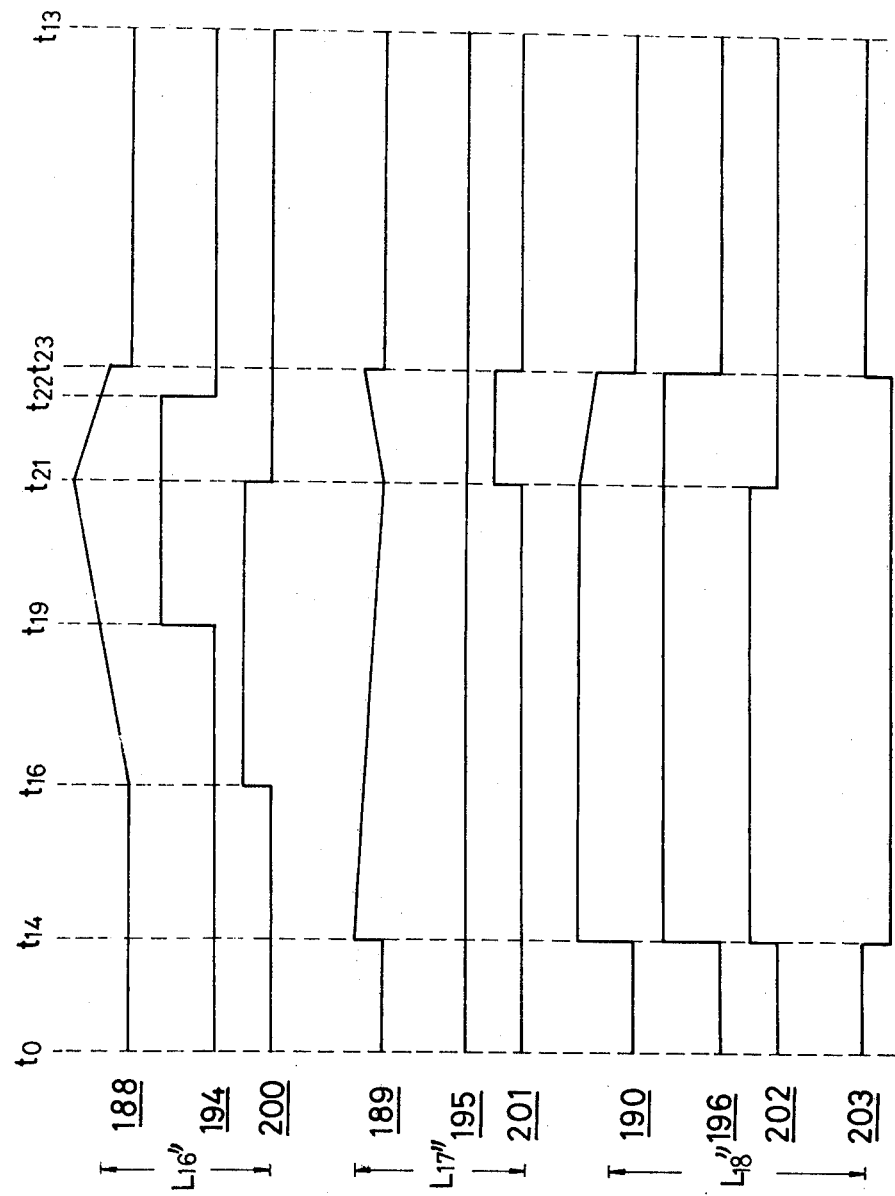

When the shapes 181, 182 and 183 are formed by the known method, signals 191 to 196 shown in FIGS. 14A and 14B are produced. For example, the waveform of the signals 194 and 196 corresponding to the scanning lines $L_{16''}$ and $L_{18''}$ change abruptly with a step, and do not conform to the ideal waveforms for the shape, which varies with a linear slope. Therefore, a shape with stepped edges is reproduced on the television picture. Thus when measuring the vertical resolution of a picture tube of a television receiver using such a shape, the measured values can only be obtained in steps. Especially for such vertical resolution measurement as the measurement of the degree of pairing of scanning lines caused by incorrect interlaced scanning, exact results cannot be obtained.

Another known way of producing a television signal for measurement of vertical or horizontal resolution, is a monoscope tube instead of digital circuits, and the focus of the monoscope tube is adjusted to effect the maximum horizontal resolution. Such precise focusing near to maximum horizontal resolution results in stepped signals just like those generated by the known digital circuit generator. Also in this case, exact vertical resolution measurement cannot be performed.

When a soft focus is given to the monoscope tube, relatively continuous shapes can be reproduced, so it is possible to perform the measurement at intermediate levels. Generally, however, it is difficult to adjust the focus of the monoscope tube or image pick-up tube precisely. Moreover, it is difficult to express numerically the degree of the focusing. Therefore, reliable measured values cannot be obtained.

According to the above-mentioned embodiments, as shown in FIGS. 14A and 14B, television signals 185 to 190 which have waveforms with appropriate leading and trailing slopes, can be produced from the pattern signals 197 to 202, so overcoming the above problems. Moreover, it is possible to express numerically the measurement condition correspondingly to focus adjustment of the monoscope. The numerical expression of the degree of focus adjustment can be established as follows.

Figure 3:
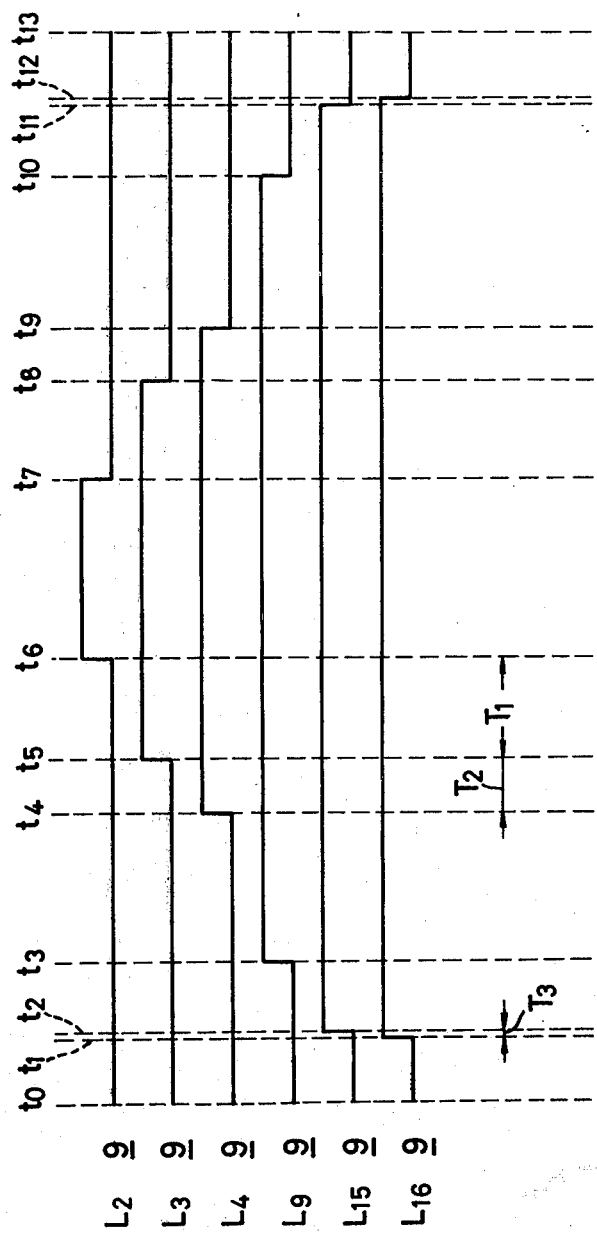
FIG. 3 is a waveform diagram of a television signal generated by known method with the generator of FIG. 2 when the circular shape of FIG. 1 is desired to be reproduced.
Figure 15:
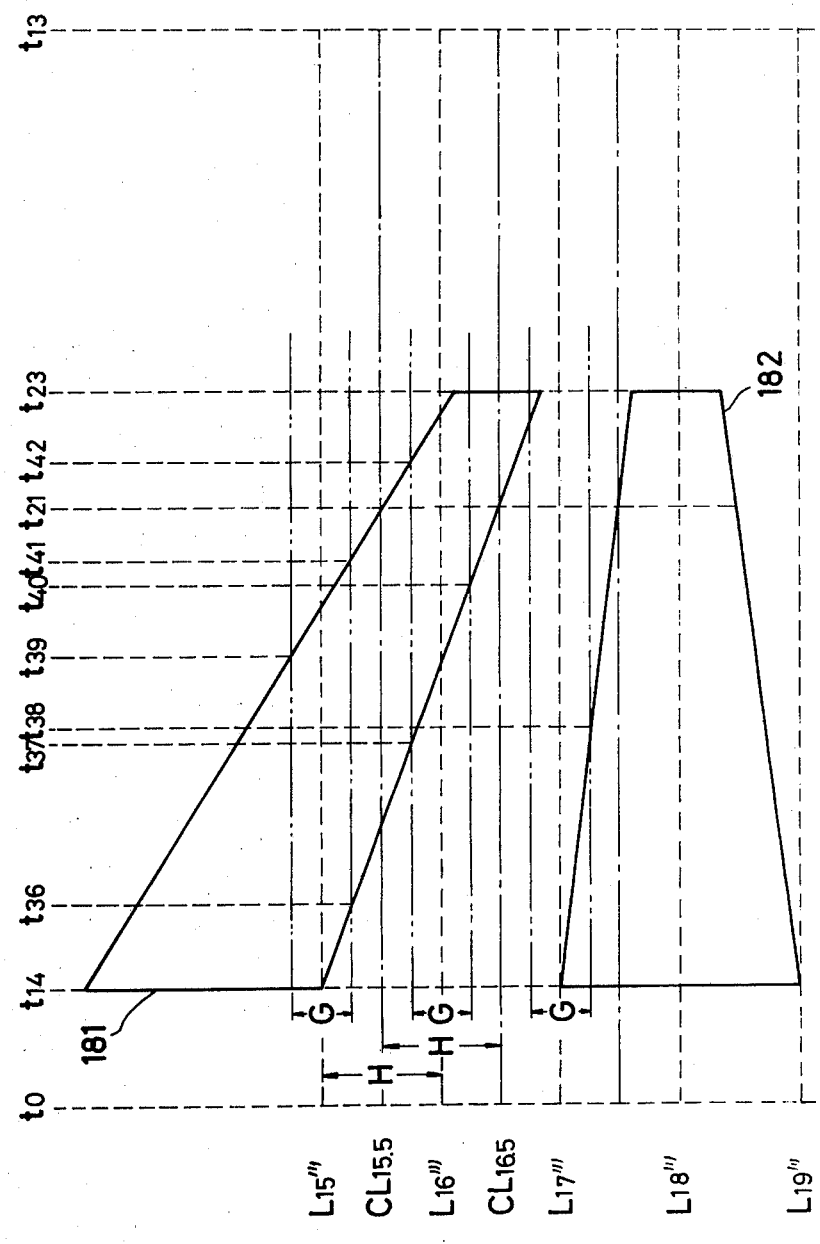
FIG. 15 is an enlarged view of a part of the television picture of FIG. 13.

FIG. 15 shows a part of the shapes in FIG. 3, enlarged vertically in relation to the scanning lines $L_{15'''}$, $L_{16'''}$, $L_{17'''}$ and $L_{18'''}$.

As shown in FIG. 15, two reference lines (double dotted lines) are taken at a predetermined interval G on each side of a center line (dotted line) of each scanning line. The positions and slopes of each leading and trailing edge of the television signal are determined on the basis of the positions and variations of the shape defined by the interval G of the two reference lines on each scanning line.

The interval G can be regarded as the value which corresponds to the diameter of a beam spot in a monoscope tube. Therefore, a ratio G/H (ratio of interval G to the wdith H of the scanning line) represents the value which corresponds to the degree of focus adjustment in the monoscope measurement system. The ratio G/H is referred to as focus index, hereinafter.

According to the focus index G/H, the signals 187, 188 and 189 of FIGS. 14A and 14B have waveforms adjusted for a focus index G/H = 1, and the signals 205, 206, and 207 of FIG. 16 for G/H = 0.5. The signals 193, 194 and 195 of FIGS. 14A and 14B produced with a conventional digital circuit correspond to a focus index G/H ÷ 0.

Consequently, in digital measurement systems, the measuring condition corresponding to the focus adjustment in monoscope measurement system can be expressed numerically by the focus index G/H. Accordingly, the reliability of measured value can be improved.

While there have been described preferred embodiments of the invention, obviously further modifications and variations are possible in the light of the above teachings. It is therefore to be understood that within the scope of the appended claims, the invention may be practised otherwise than as specifically described.

What is claimed is:

1. A television signal generator, comprising: means for generating a television signal for reproducing on a television picture tube a required pattern, shape and the like;
 a time constant circuit to change the rise and fall times respectively at every leading and trailing edge of waveforms corresponding to each horizontal scanning line of said television signal; and
 control means to selectively change the time constant of said time constant circuit such that said time constant has predetermined values, said predetermined values being selected in dependence on the variation of the outline of said pattern, shape and the like relative to each said horizontal scanning line.

2. A television signal generator according to claim 1, in which said time constant circuit includes a capacitor, a plurality of resistors, and switch means for selectively changing said time constant by selectively connecting said resistors to said capacitor to change the charging and discharging time constant of said capacitor.

3. A television signal generator according to claim 1, in which said control means comprises:
 a counter to count pulses in said television signal; and
 a memory device to store information relating to predetermined said rise and fall times, said memory device having address inputs which are designated by the outputs of said counter.

4. A television signal generator according to claim 1 in which said predetermined values are selected on the basis of the variation of the outline of said pattern, shape and the like defined between reference lines located at a predetermined interval on each side of the center line of each horizontal scanning line of said television signal.

5. A television signal generator according to claim 1, in which said predetermined values being selected in accordance with the angles of the outlines of said pattern, shape and the like relative to the respective horizontal scanning lines on said picture tube.

6. A television signal generator according to claim 1, in which said television signal generator further comprises a charging voltage setting circuit to set the charging voltage of said time constant circuit in the leading or trailing portion of said television signal.

7. A television signal generator according to claim 1 in which said television signal generator further comprises a level shift circuit for changing the signal levels of said television signal, said level shift circuit being controlled to have predetermined values by said control means.

8. A television signal generator according to claim 7, in which said time constant circuit includes a capacitor, a plurality of resistors, and switch means for selectively changing said time constant by selectively connecting said resistors to said capacitor to change the charging and discharging time constant of said capacitor.

9. A television signal generator according to claim 7, in which said control means comprises:
   a counter for counting outline pulses corresponding to the positions of outlines of the desired pattern, shape and the like;
   a first memory device to store information relating to predtermined said rise and fall times; and a second memory device to store information relating to predetermined signal levels of said television signal, said first and second memory devices each having address inputs which are designated by the outputs of said counter.

* * * * *